(12) United States Patent
Djordjevic et al.

(10) Patent No.: US 8,699,625 B2
(45) Date of Patent: Apr. 15, 2014

(54) GENERALIZED OFDM (GOFDM) FOR ULTRA-HIGH-SPEED SERIAL OPTICAL TRANSPORT NETWORKS

(75) Inventors: Ivan B. Djordjevic, Tucson, AZ (US); Lei Xu, Princeton, NJ (US); Ting Wang, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 114 days.

(21) Appl. No.: 13/270,211

(22) Filed: Oct. 10, 2011

(65) Prior Publication Data

US 2012/0263251 A1    Oct. 18, 2012

Related U.S. Application Data

(60) Provisional application No. 61/440,976, filed on Feb. 9, 2011.

(51) Int. Cl.
| | |
|---|---|
| *H03K 9/00* | (2006.01) |
| *H04Q 11/02* | (2006.01) |
| *H04B 3/20* | (2006.01) |

(52) U.S. Cl.
USPC ............................ 375/316; 370/430; 370/286

(58) Field of Classification Search
USPC ................................... 375/316; 370/286, 430
See application file for complete search history.

(56) References Cited

U.S. PATENT DOCUMENTS

| | | | | |
|---|---|---|---|---|
| 5,959,967 A | * | 9/1999 | Humphrey et al. | 370/208 |
| 6,359,938 B1 | * | 3/2002 | Keevill et al. | 375/316 |
| 6,754,170 B1 | * | 6/2004 | Ward | 370/208 |
| 2001/0006510 A1 | * | 7/2001 | Nordstrom et al. | 370/286 |
| 2002/0147978 A1 | * | 10/2002 | Dolgonos et al. | 725/62 |
| 2002/0158801 A1 | * | 10/2002 | Crilly et al. | 342/378 |
| 2002/0191630 A1 | * | 12/2002 | Jacobsen | 370/430 |
| 2003/0026295 A1 | * | 2/2003 | Baum et al. | 370/503 |
| 2003/0058787 A1 | * | 3/2003 | Vandenameele-Lepla | 370/206 |
| 2007/0011570 A1 | * | 1/2007 | Jeong et al. | 714/758 |

OTHER PUBLICATIONS

Y. Ma, Q. Yang, Y. Tang, S. Chen and W. Shieh, "1-Tb/s single-channel coherent optical OFDM transmission over 600-km SSMF fiber with subwavelength bandwidth access," Opt. Express 17, 9421-9427 (2009).
J. McDonough, "Moving standards to 100 GbE and beyond," IEEE Appl. & Practice 45, 6-9 (2007).

(Continued)

*Primary Examiner* — Leon-Viet Nguyen
*Assistant Examiner* — Sarah Hassan
(74) *Attorney, Agent, or Firm* — Joseph Kolodka

(57) ABSTRACT

A coded multidimensional modulation system called generalized OFDM (GOFDM) uses orthogonal subcarriers as bases functions, and the signal constellation points of corresponding multidimensional constellation diagram are obtained as N-dimensional Cartesian product of one-dimensional PAM/two-dimensional QAM. In GOFDM, the N-dimensional/2N-dimensional signal constellation point is transmitted over all N subcarriers/2N-subcarriers, which serve as individual bases functions. Even if some of the subcarriers are severely affected by channel distortion, the overall signal constellation point will face only small distortion, when strong channel capacity achieving channel codes are used. In addition, because the channel capacity is a linear function of number of dimensions, the spectral efficiency of optical transmission systems is significantly improved. Finally, since Euclidean distance of multidimensional signal constellation is much larger that that of two-dimensional signal constellations, OSNR sensitivity is dramatically improved.

17 Claims, 5 Drawing Sheets

(56) References Cited

OTHER PUBLICATIONS

H. G. Batshon, I. B. Djordjevic, L. Xu and T. Wang, "Modified hybrid subcarrier/amplitude/ phase/polarization LDPC-coded modulation for 400 Gb/s optical transmission and beyond," Opt. Express 18, 14108-14113 (2010).

H. G. Batshon, I. B. Djordjevic, T. Schmidt, "Ultra high speed optical transmission using subcarrier-multiplexed four-dimensional LDPC-coded modulation," Opt. Express 18, 20546-20551 (2010).

H. G. Batshon, I. B. Djordjevic, L. Xu and T. Wang, "Multidimensional LDPC-coded modulation for beyond 400 Gb/s per wavelength transmission," IEEE Photon. Technol. Lett. 21, 1139-1141 (2009).

I. B. Djordjevic, M. Arabaci, and L. Minkov, "Next generation FEC for high-capacity communication in optical transport networks" J. Lightw. Technol. 27, 3518-3530 (2009).

Y. Tang and W. Shieh, "Coherent optical OFDM transmission up to 1 Tb/s per channel," J. Lightw. Technol. 27, 3511-3517 (2009).

* cited by examiner

GENERALIZED OFDM (GOFDM) FOR ULTRA-HIGH-SPEED SERIAL OPTICAL TRANSPORT NETWORKS

The present application claims priority to Provisional Application Ser. No. 61/440,976, filed Feb. 9, 2012, the content of which is incorporated by reference.

BACKGROUND

The present application relates to ultra-high speed serial optical transport networks.

Optical communication systems have been rapidly evolving recently in order to meet continuously increasing demands on transmission capacity, originating mostly from the Internet and multimedia applications. In order to satisfy high capacity demands, according to some industry experts, the 1 TbE standard should be completed in few years. Coherent optical OFDM is one possible pathway towards achieving beyond 1 Tb/s optical transport. Initial studies, unfortunately, indicate that the system Q-factor when multiband OFDM with orthogonal sub-bands is used is too high, about 13.2 dB after 1000 km of SMF, which represents a very tight margin in terms of 7% overhead for RS(255,239) code, unless strong LDPC codes are used. Another approach is based on multi-dimensional coded modulation. Namely, by increasing the number of dimensions (i.e., the number of orthonormal basis functions), we can increase the aggregate data rate of the system without degrading the bit error rate (BER) performance as long as orthogonality among basis functions is preserved. Conventional approaches on multidimensional signal constellations for optical communications so far have been related to single carrier systems.

SUMMARY

In one aspect, a coded multidimensional modulation system called generalized OFDM (GOFDM) uses orthogonal subcarriers as bases functions, and the signal constellation points of corresponding ND-PAM constellation diagram are obtained as N-dimensional Cartesian product of one-dimensional PAM. In GOFDM, the N-dimensional signal constellation point is transmitted over all N subcarriers, which serve as individual bases functions. Even if some of the subcarriers are severely affected by channel distortion, the overall signal constellation point will face only small distortion, when strong channel capacity achieving channel codes are used. In addition, because the channel capacity is a logarithmic function of SNR but a linear function of number of dimensions, the spectral efficiency of optical transmission systems is significantly improved.

In another aspect, a high speed optical transport network includes one or more low-density parity-check (LDPC) encoders each receiving a source channel; an interleaver coupled to the LDPC encoders; an N-dimensional mapper coupled to the interleaver; and an inverse FFT (IFFT) block coupled to the interleaver and N-dimensional mapper.

Implementations of the above aspect can include one or more of the following. The orthogonal subcarriers are used as bases functions, and the signal constellation points of corresponding constellation diagram are obtained as N-dimensional Cartesian product of one-dimensional PAM. Alternately, the N-dimensional signal constellation can be designed to maximize the channel capacity. The GOFDM significantly improves OSNR sensitivity. The N-dimensional signal constellation point is transmitted over all N subcarriers, which serve as individual bases functions. If some of the subcarriers are severely affected by channel distortion, the overall signal constellation point will face only small distortion, when strong channel capacity achieving channel codes are used. The reason is that only one particular coordinate is affected, while in OFDM the subcarrier symbol will be destroyed. The GOFDM is much more immune to PMD, residual chromatic dispersion and in particular to fiber non-linearities compared to conventional single/multi-carrier systems. Because the channel capacity is a logarithmic function of SNR but a linear function of number of dimensions, the spectral efficiency of optical transmission systems can dramatically be improved with the system. The system employs N-dimensional signal constellations, therefore, for the same average symbol energy of 2D constellation, the Euclidean distance is much larger resulting in much better BER performance. For the same target BER as OFDM, the OSNR penalty improvement is large (>4 dB for large constellations).

Advantages of the embodiments of the coded ND-PAM system may include one or more of the following. The system improves dramatically OSNR sensitivity by using ND signal constellations instead of conventional 2D constellations (QAM or PSK). The system employs N-dimensional constellations, therefore, for the same average symbol energy of 2D constellation, the Euclidean distance is much larger resulting in much better BER performance. In other words, for the same target BER, OSNR penalty improvement is large (>4 dB for large constellations). Because the N-dimensional signal constellation point is transmitted over all N subcarriers, even if some of the subcarriers are severely affected by channel distortion, the overall signal constellation point will face only small distortion, when strong channel capacity achieving channel codes are used. Therefore, the system has several additional advantages compared to signal carrier, such as excellent chromatic dispersion, PMD and PDL tolerance. Compared to OFDM, it has better tolerance to PMD, PDL and in particular to fiber nonlinearities. With system transmission distances beyond 2000 km at ultra-high spectral efficiency (≥10 bits/s/Hz) are possible. In combination with quasi-cyclic nonbinary LDPC codes of large girth, we can achieve multi-Tb/s serial optical transmission for long-haul applications. With nonbinary LDPC codes, compared to binary LDPC codes, larger than 1 dB in net coding gain is possible in combination with GOFDM. With frequency-interleaving approach, we can reduce the complexity of GOFM for very large constellation sizes.

DESCRIPTION

Figure 1:
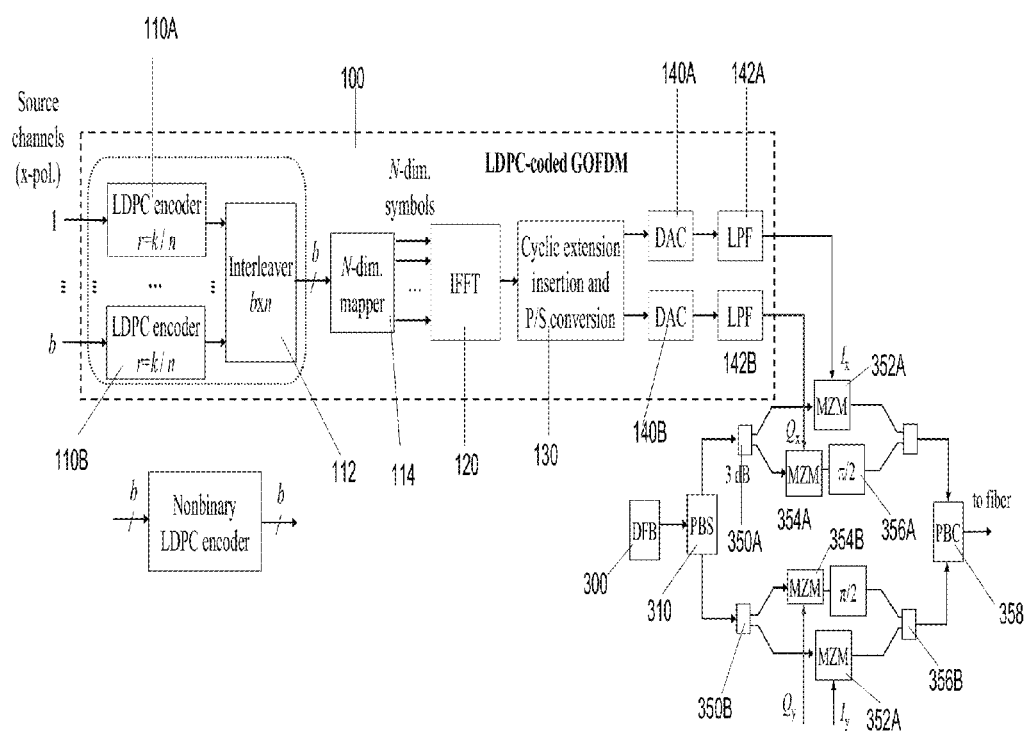
FIG. 1 shows one exemplary polarization-multiplexed LDPC-coded GOFDM transmitter configuration.
Figure 2:
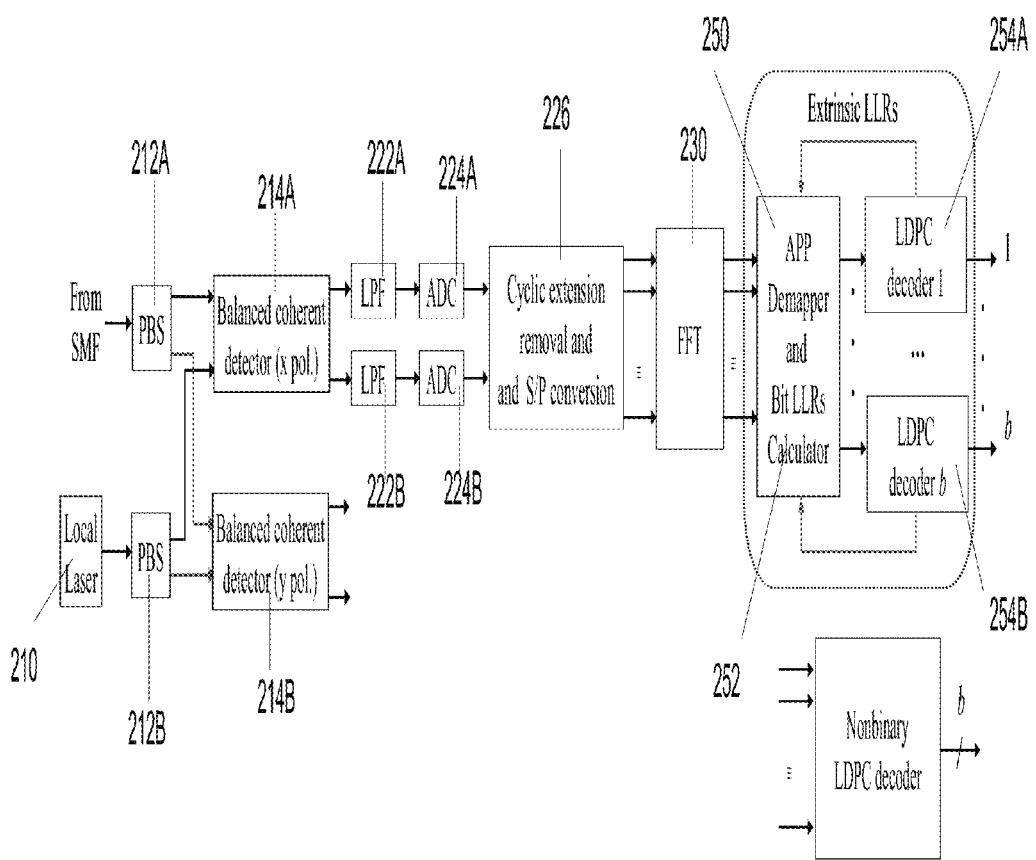
FIG. 2 shows an exemplary receiver configuration for the polarization-multiplexed LDPC-coded GOFDM system.

FIG. 1 shows one exemplary polarization-multiplexed LDPC-coded GOFDM transmitter configuration, while FIG. 2 shows an exemplary receiver configuration. The system of FIGS. 1-2 uses coded N-dimensional modulation system suitable for ultra-high-speed serial optical transport. The system can be considered as a generalization of OFDM, and can be called generalized OFDM (GOFDM). In this system, the orthogonal subcarriers are used as bases functions, and the signal constellation points of corresponding N-dimensional pulse-amplitude modulation (ND-PAM) constellation diagram are obtained as N-dimensional Cartesian product of one-dimensional PAM. Alternatively, the optimum N-dimensional signal constellations can be used obtained by maximizing the mutual information. In conventional OFDM, QAM/PSK signal constellation points are transmitted over orthogonal subcarriers and then multiplexed together in an OFDM stream. Individual subcarriers, therefore, carry N parallel QAM/PSK streams. In GOFDM instead, the N-dimensional signal constellation point is transmitted over all N subcarriers, which serve as individual bases functions. Even if some of the subcarriers are severely affected by channel distortion, the overall signal constellation point will face only small distortion, when strong channel capacity achieving channel codes are used. In addition, because the channel capacity is a logarithmic function of SNR but a linear function of number of dimensions, the spectral efficiency of optical transmission systems can be improved with GOFDM. The system employs N-dimensional signal constellations, therefore, for the same average symbol energy of 2D constellation, the Euclidean distance is much larger resulting in much better BER performance. In other words, for the same target BER, OSNR penalty improvement is large (>4 dB for large constellations).

Turning now to FIG. 1, in block 100, data from a plurality of source channels (such as x-polarization or y-polarization channels) are fed to corresponding LDPC encoders 110A-110B. The output of the LDPC encoders 110A-110B are provided to a bit-interleaver 112, which drives an N-dimensional mapper 114. The output N-dimensional mapper is processed by an inverse FFT block 120, whose output is then provided to a cyclic extension and parallel to serial (P/S) conversion blocks 130. The real and imaginary parts of 130 are then used as input to digital-to-analog converters (DACs) 140A-140B, followed by low-pass filters (LPFs) 142A-142B. The output of LPF 142A is provided to an MZM block 352A which is part of an exemplary modulator configuration in Cartesian (I/Q) coordinates. The output of LPF 142B is provided to an Mach-Zehnder modulator (MZM) block 354A, followed by π/2 phase shifter 356A, which is used to ensure the orthogonality of Q-channel with respect to I-cahnnel. In FIG. 1, a DFB 300 is connected to a PBS (polarization beam splitter) 310, splits two orthogonal polarizations that are further used as inputs to 3 dB-couplers 350A and 350B, respectively. Correspondingly, 3 dB coupler 350A outputs are used as inputs to MZMs 352A and 354A. In similar fashion, 3 dB coupler 350B outputs are used as inputs to MZMs 352B and 354B. After imposing of GOFDM streams, corresponding two orthogonal polarizations, these are combined by polarization beam combiner (PBC) 358, and such obtained signal is transmitted over SMF system of interest.

Referring now to FIG. 2, one exemplary LDPC-coded OFDM receiver is shown. In the receiver, a local laser 210 signal is split by PBS 212A into two orthogonal polarizations. On the other hand, received optical signal's polarizations are split by PBS 212B. The x-polarization outputs of the PBSes 212A-212B are used as inputs of balanced coherent detector 214A. In similar fashion, y-polarization outputs of the PBSes 212A-212B are used as inputs of balanced coherent detector 214B.

The x-polarization branch is now described. The configuration of y-polarization branch is identical to the x-polarization one. The outputs of coherent detector 214A, representing the estimated real and imaginary parts transmitted over the channel, are after LPFs 222A-222B, converted into digital domain by ADCs 224A-224B, respectively. The DACs outputs are used as inputs to the block 226, which performs cyclic extension removal and serial-to-parallel (S/P) conversion.

Next, an FFT block 230 performs GOFDM demodulation so that the outputs represent the projections along subcarrier basis functions, which are used as inputs to an APP (a posteriori probability) demapper 250, followed by Bit LLR (log-likelihood ratio) calculator 252. Bit LLR calculator block 252 provides bit LLRs to a plurality of LDPC decoders 254A-254B.

The LDPC-coded GOFDM system, which is obtained as N-dimensional generalization of OFDM and PAM with L constellation points, is shown in FIG. 1. The ND-PAM signal constellation is obtained as N-dimensional Cartesian product of one dimensional PAM signal constellation. The 1D-PAM is described with the following amplitude signal constellation points $X=\{(2i-1-L)d, i=1, 2, \ldots, L\}$, where 2d is the Euclidean distance between two neighboring points. The ND-PAM signal constellation is therefore obtained as $$X^N = \underbrace{X \times X \times \ldots \times X}_{N \text{ times}} = \{(x_1, x_2, \ldots, x_N) | x_i \in X, \forall 1 \le i \le N\}. \quad (1)$$

For example, for L=4 and N=3 the corresponding constellation diagram is given by $X^3 = X \times X \times X = \{(x_1, x_2, x_3) | x_i \in X = \{-3,-1,1,3\}, \forall 1 \le i \le 3\}$ The number of constellation points in ND-PAM is determined by $M=L^N$, while the number of bits per symbol is $b=\log_2(L^N)$. The b independent data streams are encoded using a binary LDPC (n,k) code of rate r=k/n, where n denotes the codeword length and k is the information word length. The codewords are written row-wise into b×n bit interleaver. The b bits are taken from bit interleaver column-wise at every symbol slot i and are used as input of ND mapper, which selects one constellation point out of $L^N$, depending on information content. Notice also that Cartesian product of any 2D constellation, such as QAM or PSK, can also be used in combination with this scheme. The corresponding constellation space will be 2N-dimensional. As an alternative, the optimum signal constellation, designed by maximizing the mutual information, can be used as well.

If nonbinary LDPC codes are used, the transmitter configuration is greatly simplified, as shown in FIG. 1, because the need for bit to symbol interface is avoided. To be precise, b binary LDPC encoders and the interleaver are replaced by a single nonbinary LDPC encoder that outputs b-bit symbols ready to be mapped to constellation points.

The ND mapper can be implemented as a look-up table (LUT) with b input bits serving as a memory address that selects the N-coordinates of ND-PAM signal constellation point. For example, the LUT for L=4 and N=3 ($4^3$-3D-PAM) is shown in Table 1. The N subcarriers out of $N_{sc}$ ($N<N_{sc}$ serve as bases functions for this ND-PAM signal constellation. The remained subcarriers ($N_{sc}-N$) are used for pilot estimation and zero padding. The inverse fast Fourier transform (IFFT) is then applied to perform modulation. After cyclic extension and parallel-to-serial (P/S) conversion we perform the digital-to-analog (ADC) conversion and the components corresponding to real and imaginary parts are used to modulate in-phase (I) and quadrature (Q) RF inputs of I/Q-modulator. Similar architectures are used for x- and y-polarization channels. The signals at the output of I/Q modulators are combined into single stream via polarization-beam splitter (PBS), as shown in FIG. 1(*a*). The aggregate data rate of this system is $2rbR_s$, where $R_s$ is the symbol rate. For example, by setting L=4, N=4 and $R_s$=31.25 Giga symbols/s (GS/s), the aggregate data rate is 400 Gb/s, which is compatible with 400 G Ethernet. If we increase the number of dimensions to N=10 while keeping all other parameters the same, the aggregate data rate is 1 Tb/s, which is compatible with 1 Tb/s Ethernet. The symbol rate is dictated by commercially available electronics.

TABLE 1

Mapping rule look-up table for $4^3$-3D-PAM signal constellation used in GOFDM.

| Interleaver output | Signal constellation coordinates | Interleaver output | Signal constellation coordinates | Interleaver output | Signal constellation coordinates | Interleaver Output | Signal constellation coordinates |
|---|---|---|---|---|---|---|---|
| 000000 | {−3, −3, −3} | 000010 | {−1, −3, −3} | 000001 | {1, −3, −3} | 000011 | {3, −3, −3} |
| 100000 | {−3, −3, −1} | 100010 | {−1, −3, −1} | 100001 | {1, −3, −1} | 100011 | {3, −3, −1} |
| 010000 | {−3, −3, 1} | 010010 | {−1, −3, 1} | 010001 | {1, −3, 1} | 010011 | {3, −3, 1} |
| 110000 | {−3, −3, 3} | 110010 | {−1, −3, 3} | 110001 | {1, −3, 3} | 110011 | {3, −3, 3} |
| 001000 | {−3, −1, −3} | 001010 | {−1, −1, −3} | 001001 | {1, −1, −3} | 001011 | {3, −1, −3} |
| 101000 | {−3, −1, −1} | 101010 | {−1, −1, −1} | 101001 | {1, −1, −1} | 101011 | {3, −1, −1} |
| 011000 | {−3, −1, 1} | 011010 | {−1, −1, 1} | 011001 | {1, −1, 1} | 011011 | {3, −1, 1} |
| 111000 | {−3, −1, 3} | 111010 | {−1, −1, 3} | 111001 | {1, −1, 3} | 111011 | {3, −1, 3} |
| 000100 | {−3, 1, −3} | 000110 | {−1, 1, −3} | 000101 | {1, 1, −3} | 000111 | {3, 1, −3} |
| 100100 | {−3, 1, −1} | 100110 | {−1, 1, −1} | 100101 | {1, 1, −1} | 100111 | {3, 1, −1} |
| 010100 | {−3, 1, 1} | 010110 | {−1, 1, 1} | 010101 | {1, 1, 1} | 010111 | {3, 1, 1} |
| 110100 | {−3, 1, 3} | 110110 | {−1, 1, 3} | 110101 | {1, 1, 3} | 110111 | {3, 1, 3} |
| 001100 | {−3, 3, −3} | 001110 | {−1, 3, −3} | 001101 | {1, 3, −3} | 001111 | {3, 3, −3} |
| 101100 | {−3, 3, −1} | 101110 | {−1, 3, −1} | 101101 | {1, 3, −1} | 101111 | {3, 3, −1} |
| 011100 | {−3, 3, 1} | 011110 | {−1, 3, 1} | 011101 | {1, 3, 1} | 011111 | {3, 3, 1} |
| 111100 | {−3, 3, 3} | 111110 | {−1, 3, 3} | 111101 | {1, 3, 3} | 111111 | {3, 3, 3} |

At the receiver side (see FIG. 1(b)), and using the polarization beam splitter (PBS), the optical signal is split into two orthogonal polarizations that are used as input into two balanced coherent detectors. The balanced coherent detector outputs are after sampling and analog-to-digital conversion (ADC) used as real and imaginary parts of complex sequence stream for FFT, which is used to performed demodulation. The N outputs of FFT block, corresponding to N-dimensions of ND-PAM signal constellation, are used as input of an a posteriori probability (APP) demapper, in which symbol log-likelihood ratios (LLRs) are calculated according to the following equation $$\lambda(S_i) = \log [P(S_i = S_0|R_i)/P(S_i \neq S_0|R_i)], \quad (1)$$

where $P(S_i|R_i)$ is determined by Bayes' rule as:

$$P(S_i | R_i) = P(R_i | S_i) P(S_i) \bigg/ \sum_{S'} P(R_i | S_i') P(S_i'). \quad (2)$$

The bit LLRs calculator, on the other hand, calculates the bit LLRs to be used in LDPC decoding from the symbol LLRs as follows $$L(\hat{v}_j) = \log \left[ \frac{\sum_{S_i:v_j=0} \exp(\lambda(S_i))}{\sum_{S_i:v_j=1} \exp(\lambda(S_i))} \right]. \quad (3)$$

In the above equations $S_i$ denotes the transmitted signal constellation point, $R_i$ denotes the received constellation point, where $S_0$ denotes the referent constellation point. $P(R_i|S_i)$ denotes the conditional probability that can be estimated by collection of histograms. In quasi-linear regime, the Gaussian approximation can be used. P(S) denotes a priori probability of symbol S, while $\hat{v}_j$, ($j \in \{0, 1, \ldots, n-1\}$) is the jth bit estimate of the codeword v. The bit LLRs are forwarded to LDPC decoders, which provide extrinsic bit LLRs for demapper and are used as inputs to (2) as prior information.

Similar to the transmitter side, the use of nonbinary LDPC codes greatly simplifies the receiver configuration. To elaborate, when nonbinary LDPC codes are used, b binary LDPC decoders (see shaded block in FIG. 1b) and the bit LLR calculation block are replaced by single nonbinary LDPC decoder (also shown in FIG. 1b). Moreover, there is no need to iterate the extrinsic information at all, which in addition to decreasing decoding complexity also reduces the latency of decoding. Finally, the nonbinary LDPC codes provide much larger coding gains compared to bit-length-matched binary LDPC codes.

One difference of GOFDM system compared to OFDM is that a given signal constellation point is transmitted over all subcarriers simultaneously. On the other hand, in OFDM different MPSK/QAM sequences are used on different subcarriers and then multiplexed together in a single OFDM symbol. If a particular subcarrier is severely affected by channel distortion the information symbol will be lost. In the instant system, however, only one particular coordinate will be affected. Therefore, the system will be much more efficient in dealing with various channel distortions. In addition, the system employs the N-dimensional signal constellations, while in OFDM only 2D signal constellations are used. For the same symbol energy, the Euclidean distance between signal constellation points is much larger in N-dimensional space (N≥3) than in 2D one resulting in much better OSNR sensitivity as shown later.

Next, frequency interleaving/deinterleaving enabling beyond multi-Tb/s Ethernet based on GOFDM is described. In theory, the system can increase the aggregate data rate by simply increasing the number of subcarriers as long as the orhtogonality among subcarriers is preserved. However, the complexity of APP demapper of FIG. 2 increases with N. To keep the complexity of APP demapper reasonably low, one implementation of the system splits the total number of subcarriers Nsc=$N^2$ into N subgroups of N subcarriers. Next, the kth group of subcarriers (k=1, . . . , N) to be used in the N-dimensional signal constellation is formed by taking each kth element of all subgroups. Finally, the system performs encoding, modulation, transmission, demodulation, decoding on all groups as shown in FIGS. 1 and 2. On such a way, if several subcarriers (coordinates) are affected by channel distortion they will belong to different constellation points and system will be still more immune to channel distortion compared conventional OFDM. By using sufficiently high dimensionality of signal constellations (N≥3), the OSNR improvement advantage will still be preserved.

The system can be considered as a generalization of OFDM, and can be called generalized OFDM (GOFDM). In this system, the orthogonal subcarriers are used as bases functions, and the signal constellation points of as N-dimensional Cartesian product of one-dimensional PAM. In conventional OFDM, QAM/PSK signal constellation points are transmitted over orthogonal subcarriers and then multiplexed together in an OFDM stream. Individual subcarriers therefore carry N parallel QAM/PSK streams. In GOFDM instead, the N-dimensional signal constellation point is transmitted over all N subcarriers, which serve as individual bases functions. Even if some of the subcarriers are severely affected by channel distortion, the overall signal constellation point will face only small distortion, when strong channel capacity achieving channel codes are used. In addition, because the channel capacity is a logarithmic function of SNR but a linear function of number of dimensions, the spectral efficiency of optical transmission systems can dramatically be improved with the instant system. The system employs N-dimensional signal constellations, therefore, for the same average symbol energy of 2D constellation, the Euclidean distance is much larger resulting in much better BER performance. In other words, for the same target BER, OSNR penalty improvement is large (>4 dB for large constellations).

The orthogonal subcarriers are used as bases functions, and the signal constellation points of corresponding constellation diagram are obtained as N-dimensional Cartesian product of one-dimensional PAM. The GOFDM significantly improves OSNR sensitivity. The N-dimensional signal constellation point is transmitted over all N subcarriers, which serve as individual bases functions. If some of the subcarriers are severely affected by channel distortion, the overall signal constellation point will face only small distortion, when strong channel capacity achieving channel codes are used. The reason is that only one particular coordinate is affected, while in OFDM the subcarrier symbol will be destroyed. The GOFDM is much more immune to PMD, residual chromatic dispersion and in particular to fiber nonlinearities compared to conventional single-/multi-carrier systems. Because the channel capacity is a logarithmic function of SNR but a linear function of number of dimensions, the spectral efficiency of optical transmission systems can dramatically be improved with the system. The system employs N-dimensional signal constellations, therefore, for the same average symbol energy of 2D constellation, the Euclidean distance is much larger resulting in much better BER performance. For the same target BER as OFDM, the OSNR penalty improvement is large (>4 dB for large constellations).

Figure 3A:
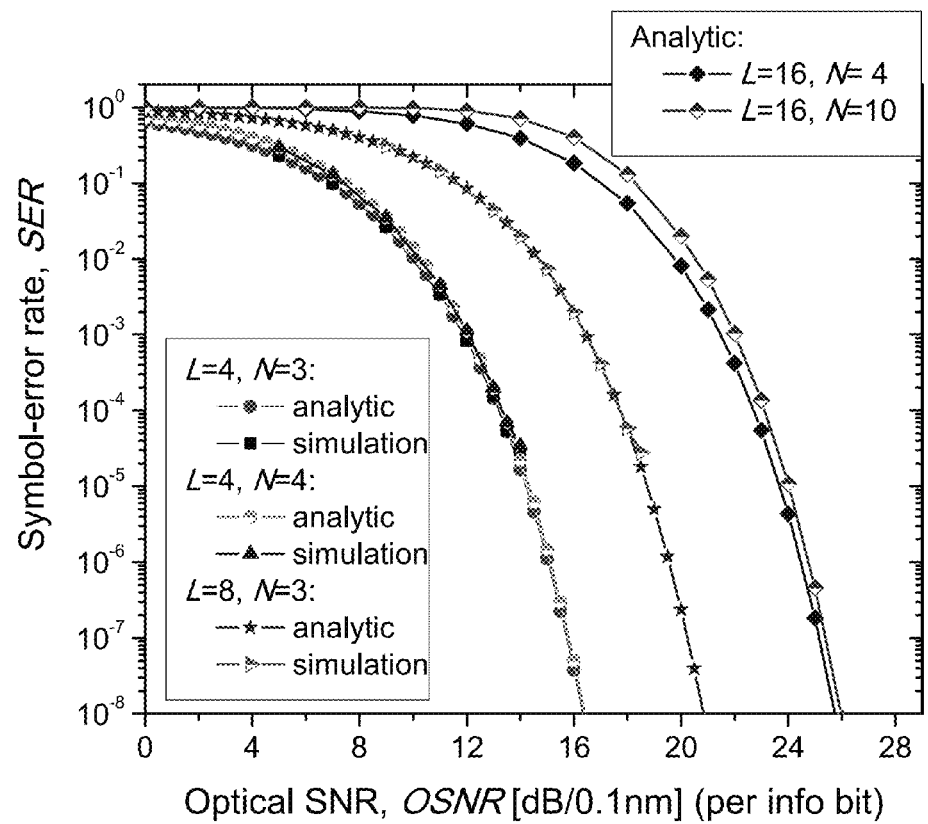
FIGS. 3A-3C show exemplary simulation results of the polarization-multiplexed LDPC-coded GOFDM system.

FIG. 3A shows simulated GOFDM system performance for uncoded symbol error-rates for symbol rate of 25 GS/s, and binary-LDPC-coded GOFDM BER performance at symbol rate of 31.25 Gb/s.

Figure 3B:
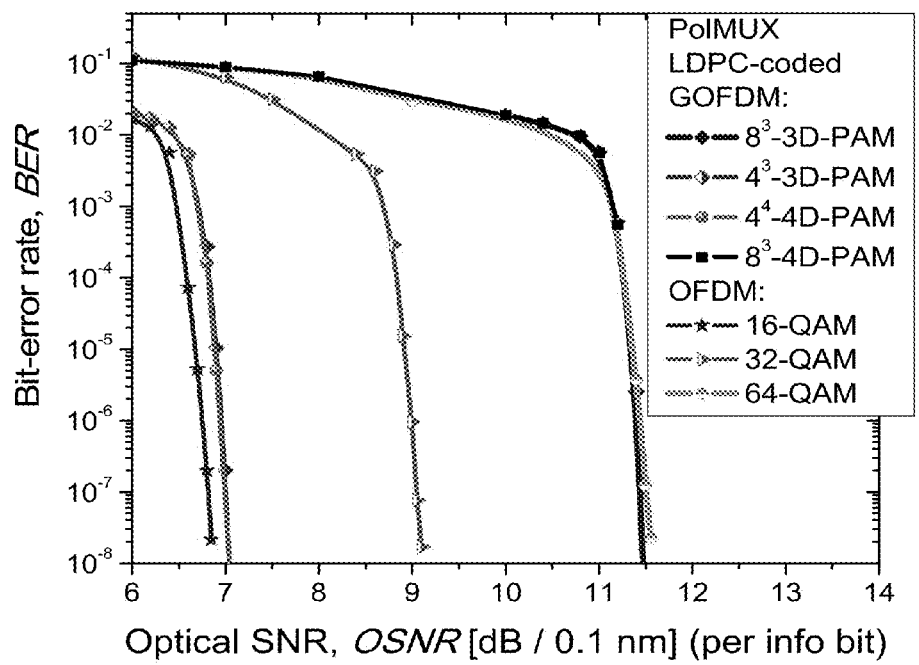

As an illustration of the potential of the proposed system, FIG. 3B shows the BER performance of the binary LDPC (16935, 13550)-coded GOFDM systems for symbol rate of 31.25 GS/s. As expected, the increase in the number of dimensions for fixed L results in negligible BER performance degradation. The comparison of corresponding curves with L=4 and L=8 indicates that in order to increase the aggregate data rate it would be better to increase the number of subcarriers rather than the 1D-PAM signal constellation size. The $4^3$-3D-PAM-based-GOFDM outperforms corresponding 64-QAM-OFDM for fantastic 4.281 dB at BER of 10-8! The PolMUX $4^4$-3D-PAM performs just slightly worse than PolMux 16-QAM-OFDM, but has the aggregate data rate of 400 Gb/s and as such is compatible with future 400 G Ethernet. The aggregate data rate of PolMux 16-QAM-OFDM is only 200 Gb/s. If the system instead uses the GOFDM with L=4 and N=10 the resulting aggregate data rate is 1 Tb/s. Therefore, the GOFDM system is both 400 Gb/s and 1 Tb/s Ethernet enabling coded-modulation system.

Figure 3C:
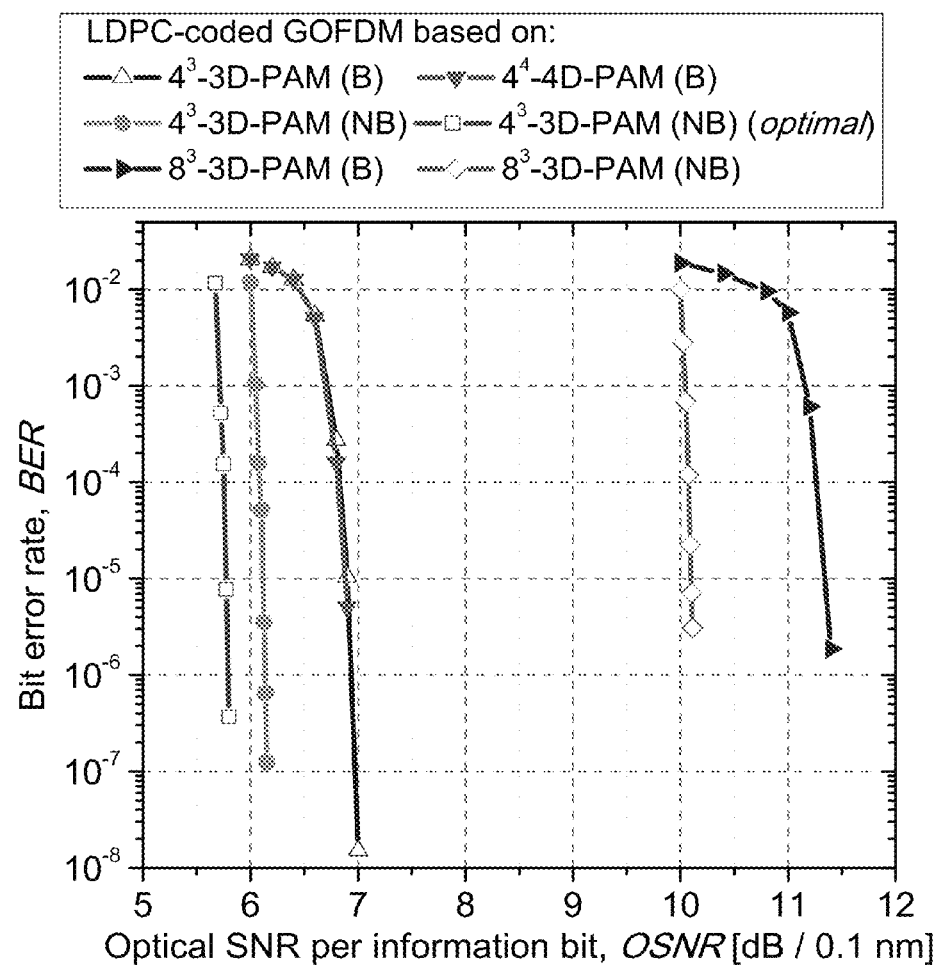

FIG. 3C shows simulated BER performance of proposed coded GOFDM system, when nonbinary LDPC(16935, 13550), is used. For GOFDM based on $4^3$-3D-PAM, the nonbinary coded modulation system outperforms the binary system by 0.87 dB. On the other hand, for GOFDM based on $8^3$-3D-PAM, the nonbinary coded modulation system outperforms the binary system by even 1.29 dB. What is also interested to notice form FIG. 3C that the ND-PAM signal constellation performs close to the optimum signal constellation based on sphere-packing method. Namely, the nonbinary LDPC-coded 4D-PAM performs only 0.33 dB worse than corresponding optimum signal constellation, but it is much easier to implement. The coded GOFDM system is advantageous in that it improves dramatically OSNR sensitivity by using ND signal constellations instead of conventional 2D constellations (QAM or PSK). Because the N-dimensional signal constellation point is transmitted over all N subcarriers, even if some of the subcarriers are severely affected by channel distortion, the overall signal constellation point will face only small distortion, when strong channel capacity achieving channel codes are used. Therefore, the system has several additional advantages compared to signal carrier, such as excellent chromatic dispersion, PMD and PDL tolerance. The system has much better tolerance to fiber nonlinearities. With system transmission distances beyond 2000 km at ultra-high spectral efficiency (≥10 bits/s/Hz) are possible. In combination with quasi-cyclic nonbinary LDPC codes of large girth, we can achieve beyond multi-Tb/s serial optical transmission for long-haul applications. With nonbinary LDPC codes, compared to binary LDPC codes, larger than 1 dB in net coding gain is possible in combination with GOFDM. With frequency-interleaving approach, we can reduce the complexity of GOFM for very large constellation sizes. The system employs N-dimensional signal constellations, therefore, for the same average symbol energy of 2D constellation, the Euclidean distance is much larger resulting in much better BER performance. For the same target BER as OFDM, the OSNR penalty improvement is large (>4 dB for large constellations).

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A high speed optical transport network, comprising:
   one or more low-density parity-check (LDPC) encoders each receiving a source channel;
   an interleaver coupled to the LDPC encoders;
   an N-dimensional mapper coupled to the interleaver;

an inverse FFT (IFFT) block coupled to the N-dimensional mapper to generate N-dimensional pulse-amplitude modulation (ND-PAM) signal constellation points' coordinates;

a cyclic extension insertion and parallel to serial (P/S) conversion block coupled to the IFFT block;

means for adding all coordinates, upon multiplication with exp[j2nkt/T], to provide real and imaginary parts of a signal used as in-phase and quadrature signals for Mach-Zehnder modulators (MZMs);

wherein an FFT block provides projections along subcarrier basis functions, and where a kth FFT output represents the projection along a kth coordinate; and wherein an a posteriori probability (APP) demapper comprises a symbol log-likelihood ratio (LLR) calculator to determine $$\lambda(S_i) = \log[P(S_i=S_0|R_i)/P(S_i \neq S_0|R_i)],$$

where $P(S_i|R_i)$ is determined by Bayes' rule as:

$$P(S_i|R_i) = P(R_i|S_i)P(S_i) \bigg/ \sum_{S'} P(R_i|S_i')P(S_i');$$

wherein $S_i$ denotes a transmitted signal constellation point, $R_i$ denotes a received constellation point, where $S_0$ denotes a referent constellation point, $P(R_i|S_i)$ denotes a conditional probability estimated by collection of histograms, and P(s) denotes a priori probability of symbol S.

2. The network of claim 1, wherein signal constellation points of an N-dimensional pulse amplitude modulation (ND-PAM) constellation diagram are generated as an N-dimensional Cartesian product of a one-dimensional PAM; and wherein the N-dimensional signal constellation points are transmitted over all N orthogonal subcarriers serving as individual bases functions.

3. The network of claim 1, wherein signal constellation points are obtained as N-dimensional Cartesian product of a two-dimensional QAM or PSK signal constellations; and wherein the 2N-dimensional signal constellation points are transmitted over all 2N orthogonal subcarriers serving as individual bases functions.

4. The network of claim 3, comprising digital to analog converters coupled to the cyclic extension insertion and parallel to serial (P/S) conversion block.

5. The network of claim 3, comprising:
  a. digital to analog converters (DACs) coupled to the cyclic extension insertion and parallel to serial (P/S) conversion block; and
  b. low pass filters coupled to the DACs, respectively.

6. The network of claim 1, wherein signal constellation points are obtained maximizing the mutual information of the channel; and wherein the N-dimensional signal constellation points are transmitted over all N orthogonal subcarriers serving as individual bases functions.

7. The network of claim 1, comprising a receiver to receive ND-PAM signals.

8. The network of claim 1, comprising a receiver to receive ND-QAM signals.

9. The network of claim 1, comprising a receiver to receive ND-optimum signal constellation signals.

10. The network of claim 9, comprising a cyclic extension removal and serial to parallel (S/P) conversion block coupled to the DACs.

11. The network of claim 10, wherein the FFT block is coupled to the cyclic extension removal and serial to parallel (S/P) conversion block.

12. The network of claim 11, wherein the APP demapper is coupled to the FFT block.

13. The network of claim 1, comprising a polarization beam splitter coupled to the receiver for splitting the ND-PAM signals or ND-QAM signals into two orthogonal polarizations that are used as input into two coherent detectors.

14. The network of claim 1, wherein a coherent detector generates outputs as real and imaginary parts of a complex sequence stream.

15. The network of claim 13, comprising:
  a. digital to analog converters (DACs) coupled to the coherent detectors; and
  b. low pass filters coupled to the DACs, respectively.

16. The network of claim 1, comprising performing an N-dimensional mapper as a look-up table (LUT) with b input bits serving as a memory address that selects the N-coordinates of an ND-PAM signal constellation point.

17. The network of claim 1, comprising performing an 2N-dimensional mapper as a look-up table (LUT) with b' input bits serving as a memory address that selects the 2N-coordinates of an ND-QAM signal constellation point.

* * * * *